United States Patent
Kao

(10) Patent No.: US 11,235,667 B1
(45) Date of Patent: Feb. 1, 2022

(54) MULTI-SPEED ELECTRIC VEHICLE POWER-ON UPSHIFT CONTROL

(71) Applicant: GM Global Technology Operations LLC, Detroit, MI (US)

(72) Inventor: Chi-kuan Kao, Troy, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 17/176,776

(22) Filed: Feb. 16, 2021

(51) Int. Cl.
| | |
|---|---|
| *B60W 10/08* | (2006.01) |
| *B60L 15/20* | (2006.01) |
| *B60K 17/356* | (2006.01) |
| *B60K 23/08* | (2006.01) |
| *B60W 10/02* | (2006.01) |

(Continued)

(52) U.S. Cl.
CPC ............ *B60L 15/2054* (2013.01); *B60K 1/02* (2013.01); *B60K 17/356* (2013.01); *B60K 23/0808* (2013.01); *B60W 10/02* (2013.01); *B60W 10/08* (2013.01); *B60W 10/10* (2013.01); *B60W 10/119* (2013.01); *B60W 30/025* (2013.01); *F16H 61/0204* (2013.01); *F16H 61/0437* (2013.01); *B60L 2240/423* (2013.01); *B60L 2240/507* (2013.01); *B60L 2250/28* (2013.01); *B60W 2540/10* (2013.01); *B60W 2710/021* (2013.01); *B60W 2710/083* (2013.01); *F16H 2061/0075* (2013.01)

(58) Field of Classification Search
CPC ........... B60L 15/2054; B60L 2240/423; B60L 2240/507; B60L 2250/28; B60K 1/02; B60K 17/356; B60K 23/0808; B60W 10/02; B60W 10/08; B60W 10/10; B60W 10/119; B60W 30/025; B60W 2540/10; B60W 2710/021; B60W 2710/083; F16H 61/0204; F16H 61/0437; F16H 2061/0075
See application file for complete search history.

(56) References Cited

U.S. PATENT DOCUMENTS

| | | | |
|---|---|---|---|
| 7,742,852 B1 | 6/2010 | Tang | |
| 9,527,503 B2 | 12/2016 | Chung et al. | |

(Continued)

FOREIGN PATENT DOCUMENTS

| | | | | |
|---|---|---|---|---|
| KR | 20120122599 A | * | 11/2012 | ............ B60W 30/20 |

*Primary Examiner* — Justin Holmes
(74) *Attorney, Agent, or Firm* — Vivacqua Crane PLLC

(57) ABSTRACT

A method for multi-speed electric vehicle shift control for damping an acceleration oscillation of the electric vehicle. The method includes determining a percentage of accelerator pedal travel and then retrieving a clutch calibration, a first electric motor calibration, and a second electric motor calibration correlating with the determined percentage of accelerator pedal travel. The method then applies the clutch calibration in actuating a clutch-to-clutch gear ratio change, thereby generating a vibration fluctuation in a first axle, and applies the first electric motor calibration in modulating a first electric motor to dampen the vibration fluctuation. The clutch actuation and first electric motor modulation together produces a first axle torque oscillation. The method applies the second electric motor calibration in modulating the second electric motor to generate a second axle torque oscillation sufficiently out-of-phase with the first axle torque oscillation, thereby dampening the vehicle acceleration oscillation of the electric vehicle.

20 Claims, 5 Drawing Sheets

(51) Int. Cl.
  *B60W 10/119*  (2012.01)
  *B60W 10/10*   (2012.01)
  *F16H 61/02*   (2006.01)
  *F16H 61/04*   (2006.01)
  *B60W 30/02*   (2012.01)
  *B60K 1/02*    (2006.01)
  *F16H 61/00*   (2006.01)

(56) References Cited

U.S. PATENT DOCUMENTS

| | | | |
|---|---|---|---|
| 2003/0029653 A1* | 2/2003 | Fujikawa | B60K 6/387 |
| | | | 180/65.25 |
| 2017/0253143 A1 | 9/2017 | Tang | |
| 2019/0031178 A1* | 1/2019 | Liu | B60W 20/17 |
| 2019/0322266 A1* | 10/2019 | Fukushiro | B60K 6/52 |

\* cited by examiner

MULTI-SPEED ELECTRIC VEHICLE POWER-ON UPSHIFT CONTROL

INTRODUCTION

The present disclosure relates to a method of shift control for multi-speed electric vehicles, more particularly to a method of power-on upshift control for electric vehicles having a front electric motor driving a front axle and a rear electric motor driving a rear axle.

The trend of the automotive industries is the move toward the manufacturing and selling of electric vehicles. Electric vehicles are desirable amongst car buyers because there are no tail pipe greenhouse gas and polluting particulate matter emissions. Electric vehicles are inherently fuel efficient, even when charged with power generated by non-renewable sources, such as fossil fuels, when compared to traditional vehicles utilizing internal combustion engines. To further increase the fuel efficiency and performance of electric vehicles, multi-speed gearboxes are mated to the electric motors. The multi-speed gearbox may be that of a two-speed gearbox having a simple planetary gear set and clutches configured to selectively provide a first gear ratio output and a second gear ratio output to a drive axle.

As electric vehicles gain in popularity, so has the demand for increased safety and performance of electric vehicles. Electric vehicles are provided with multiple motors to enable all-wheel drive (AWD) or 4-wheel drive (4WD) modes for increased safety for operating in increment weather conditions and improved performance in off-road ventures. Under wet or icy road conditions, AWD/4WD drive systems can selectively transfer torque to the axles having wheels with traction to improve safety. In one example of such an AWD/4WD system for an electric vehicle, a first electric motor is provided for driving the front axle and a second electric motor is provided for driving the rear axle.

In the exemplary AWD/4WD electric vehicle, the first electric motor or the second electric motor may be the dedicated drive motor, also known as the primary motor, for propelling the vehicle and the other of the electric motors may be a supplemental drive motor, also known as an assisting motor. Both the dedicated and supplemental motors are energized when torque is required for both the front and rear axles. A multi-speed gearbox, also referred to as a transmission, may be coupled to the primary motor to provide additional drive ratios to increase drive performance and longevity of the electric motor.

For electric vehicles having a multi-speed gearbox where the change in gear ratios are effectuated by a clutch-to-clutch shift, which is when a first clutch disengages a first gear element and a second clutch engages a second gear element to effectuate a gear ratio change, it is not atypical for the electric vehicle to experience an oscillation in vehicle acceleration during the clutch-to-clutch shift event. The oscillation in vehicle acceleration is experienced by the occupants of the vehicle as a shutter and/or vibration, which is perceived as a low quality transmission shift. This momentary oscillation in vehicle acceleration is more noticeable during a power-on upshift of gear ratios.

Thus, while AWD/4WD vehicles having a primary motor mated to a multi-speed gear box achieve their intended purpose, there is need for continual improvement of perceived shift quality during a clutch-to-clutch shift event for the improved comfort and drive experience of the occupants of the electric vehicle.

SUMMARY

According to several aspects, a method of shift control for an electric vehicle is provided. The electric vehicle includes a multi-speed gearbox adapted to receive a first motor torque from a first electric motor and output a first axle torque to a first axle. The multi-speed gearbox includes at least one actuatable clutch for selectively effectuating a gear ratio change. The method includes detecting a shift event for the multi-speed gearbox, actuating the at least one actuatable clutch to effectuate the gear ratio change, thereby generating a first axle torque oscillation in the first axle, and modulating a second electric motor to generate a second axle torque oscillation in a second axle sufficient to compensate for the first axle torque oscillation in the first axle to reduce the overall vehicle acceleration oscillation and achieve high drive shift quality.

In an additional aspect of the present disclosure, the method further includes determining a percent of travel of an accelerator pedal when the shift event is detected; retrieving a second electric motor calibration correlating to the determined percent of travel of the acceleration pedal; and applying the second electric motor calibration in modulating the second electric motor to generate the second axle torque oscillation in the second axle sufficient to compensate for the first axle torque oscillation in the first axle to reduce the overall vehicle acceleration oscillation and achieve high drive shift quality.

In another aspect of the present disclosure, the method further includes retrieving a clutch actuation calibration correlating to the determined percent of travel of the acceleration pedal and applying the clutch actuation calibration in actuating the at least one clutch to effectuate the gear ratio change.

In another aspect of the present disclosure, the method further includes retrieving a first electric motor calibration correlating to the determined percent of travel of the acceleration pedal, and applying the first electric motor calibration in modulating the first electric motor and the actuating the at least one clutch to generate the first torque oscillation in the first axle.

In another aspect of the present disclosure, wherein the second axle torque oscillation is out-of-phase with the first torque oscillation.

In another aspect of the present disclosure, the method further includes a power-on upshift, wherein actuating the at least one clutch includes a clutch-to-clutch shift defining a torque phase followed by an inertial phase.

In another aspect of the present disclosure, wherein the first electric motor calibration includes decreasing the first motor torque during the inertial phase, and wherein the second electric motor calibration includes increasing a second motor torque during the torque phase.

In another aspect of the present disclosure, wherein the second electric motor calibration includes modulating the second motor during and after the inertial phase.

According to several aspects, a method for multi-speed electric vehicle power-on upshift control is provided. The method includes displacing an accelerator pedal; detecting a shift event for a multi-speed gearbox adapted to receives a first motor torque from a first electric motor and outputs a first axle torque to a first axle, wherein the multi-speed gearbox includes a plurality of actuatable clutches for effectuating a gear ratio change; determining a percentage of accelerator pedal travel when the shift event is detected; retrieving a clutch calibration, a first electric motor calibration, and a second electric motor calibration correlating with the determined percentage of accelerator pedal travel; applying the clutch calibration in actuating the plurality of actuable clutches to effectuate the gear change ratio and applying the first electric motor calibration in modulating the first electric motor, wherein the actuating of the plurality of actuable clutches and the modulating the first electric motor generates a first axle torque oscillation in the first axle; and applying the second electric motor calibration in modulating the second electric motor to generate a second axle torque oscillation effective to compensate for the first axle torque oscillation to reduce the overall vehicle acceleration oscillation and achieve high drive shift quality.

In an additional aspect of the present disclosure, wherein actuating the plurality of actuatable clutches includes a clutch-to-clutch upshift defining a torque phase and an inertial phase, modulating the first electric motor includes decreasing a first motor torque during the inertial phase, and modulating the second electric motor includes increasing a second motor torque during the torque phase.

In another aspect of the present disclosure, wherein the second electric motor calibration includes modulating the second motor torque during the inertial phase and after the inertial phase to generate a second axle torque oscillation sufficiently out-of-phase with the first axle torque oscillation to dampen the vehicle acceleration oscillation of the electric vehicle.

According to several aspects, a method for multi-speed electric vehicle shift control for damping a vehicle acceleration oscillation of the electric vehicle is provided. The method includes determining a percentage of accelerator pedal travel and then retrieving a clutch calibration, a first electric motor calibration, and a second electric motor calibration correlating with the determined percentage of accelerator pedal travel. The method then applies the clutch calibration in actuating a clutch-to-clutch gear ratio change, thereby generating a vibration fluctuation in a first axle, and applies the first electric motor calibration in modulating a first electric motor to dampen the vehicle acceleration vibration fluctuation. The clutch actuation and first electric motor modulation together produces a first axle torque oscillation. The method applies the second electric motor calibration in modulating the second electric motor to generate a second axle torque oscillation sufficiently out-of-phase with the first axle torque oscillation, thereby dampening the vehicle acceleration oscillation of the electric vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale and some features may be exaggerated or minimized to show details of particular features. The specific structural and functional details disclosed are not intended to be interpreted as limiting, but as a representative basis for teaching one skilled in the art as to how to practice the disclosed concepts.

Figure 1:
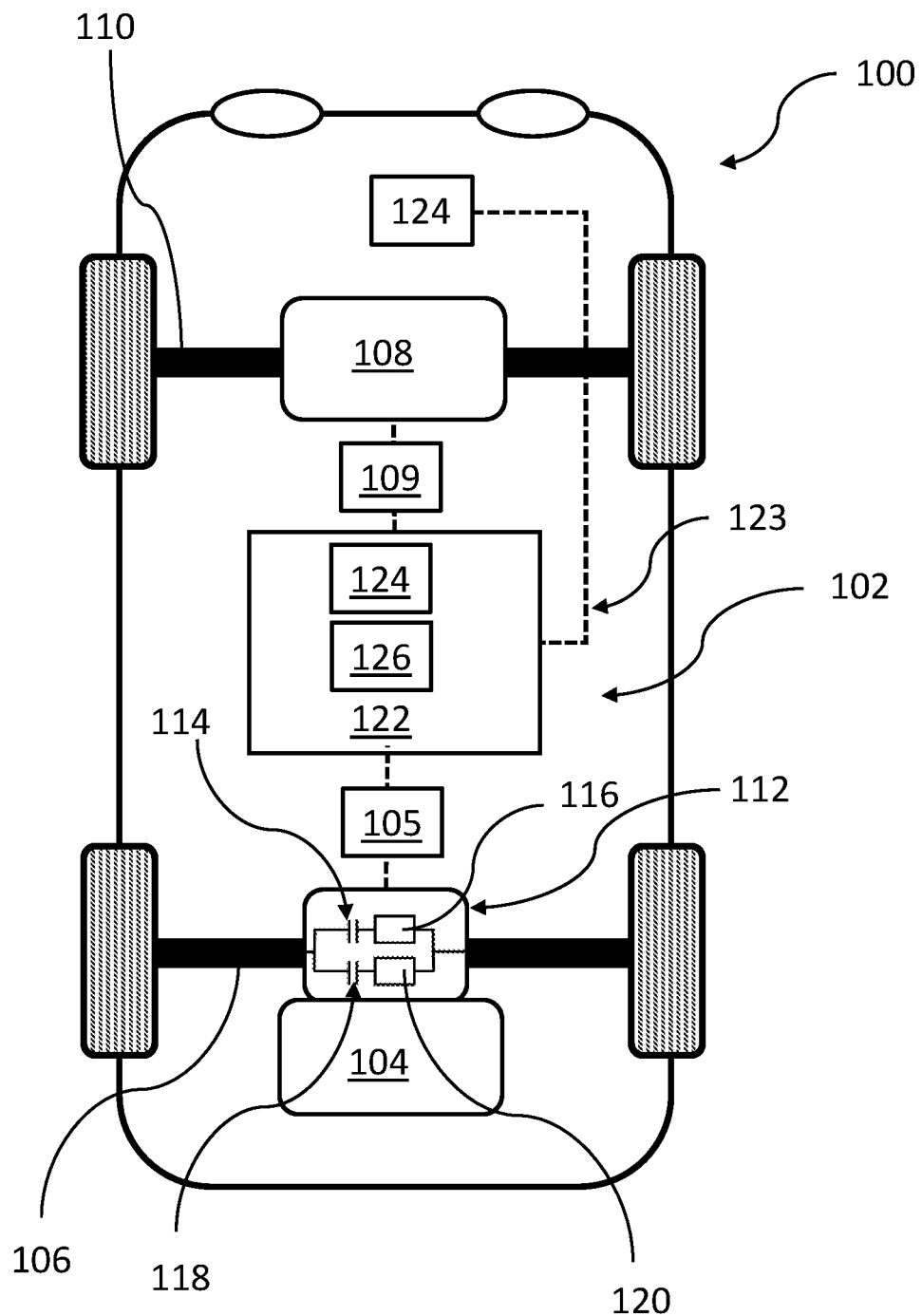
FIG. 1 is a functional diagram of an electric vehicle having a primary electric motor mated to a multi-speed gearbox and an assisting electric motor, according to an exemplary embodiment.

Referring to FIG. 1, is an example of an electric vehicle 100 configured for all-wheel drive (AWD) or 4-wheel drive (4WD) modes. The terms "electric vehicle" and "EV" are used herein interchangeably and refer to an all-electric vehicle. The electric vehicle 100 may include any passenger or commercial vehicles such as a car, a truck, a sport utility vehicle, a crossover vehicle, a van, a minivan, a taxi, a bus, motorcycle, etc. The terms "AWD" and "4WD" are used herein interchangeably and refer to an EV drive system in which the front axle and the rear axle are each driven by a separate electric motor.

The electric vehicle 100 includes an AWD/4WD system 102 having a first electric motor 104 configured to selectively provide a first motor torque output to a first axle 106 of the electric vehicle 100 and a second electric motor 108 configured to selectively provide a second motor torque output to a second axle 110 of the electric vehicle 100. In the exemplary electric vehicle 100, the first axle 106 is shown as the rear axle 106 and the second axle 110 is shown as the front axle 110, with respect to a forward operating direction of the electric vehicle 100. The first and second electric motors 104, 108 may be alternating current (AC) motors or direct current (DC) motors designed to output a relatively flat torque curve over a wide range of speeds. Each of the first and second electric motors 104, 108 are powered through a power modulator 105, 109, respectively, so that the motor torque outputs of the first and second electric motors 104, 108 is capable of being independently modulated by a controller 122, which is disclosed in detail below.

A typical multi-speed transmissions used in electric vehicle 100 includes two gear ratio outputs and is referred to as a two-speed transmission or gearbox. An exemplary two-speed gearbox may include a planetary gear set (not shown) and a pair of clutches working in concert for selectively disengaging and engaging gear elements of the planetary gear set to change from a first gear ratio output to a second gear ratio output or from the second gear ratio output to the first gear ratio output. The shifting process where one clutch disengages a first gear element and the other clutch engages a second gear element to effectuate a gear ratio change is known as a clutch-to-clutch shift.

In the exemplary electric vehicle 100, the first electric motor 104 is coupled to a two-speed gearbox 112 having a first clutch 114 configured to selectively engage a first gear ratio 116 and a second clutch 118 configured to selectively engage a second gear ratio 120. In the embodiment shown, the two-speed gearbox 112 is adapted to output an axle torque to the rear axle 106. However it is appreciated that the two-gearbox 112 may be adapted to output an axle torque to the front axle 110 in the alternative. It should be understood that the exemplary vehicle 100 is not limited to a specific type or configuration of gearbox, the number of speed of gearbox, a specific type or gearbox, or configuration of gearbox. For example, although a two speed gearbox 112 is described, the gearbox 112 may include greater than two speed ratios and may include any types of gear sets that may be selected by a clutch-to-clutch shift. The second gear ratio is higher than the first gear ratio, meaning that when in the second gear ratio, the efficiency range of the vehicle 100 is effectively widened, thereby increasing the top speed of the electric vehicle 100 without spinning the first electric motor 104 faster or using more electricity.

The torque/power output generated by the electric motors 104, 108 may be modulated by a controller 122. The controller 122 determines the power (i.e., voltage, current, and waveform) that each of the power control modules 105, 109 supplies to their respective electric motors 104, 108, and thus the torque and power that each electric motor 104, 108 applies to the axle 106, 110 to which it is coupled. In order to calculate the appropriate power to be supplied to each motor in order to modulate the torque output of each motor, and the controller 122 receives data from, a variety of sensors (not shown) and actuators throughout the vehicle 100, as well as vehicle calibration data from a look-up table stored in the controller 122. In general, these sensors and actuators 124 include those that are used to monitor vehicle performance, those used to monitor the drive system, those used to monitor the condition and performance of the vehicle 100 and the power control electronics, and those used to monitor user input such as a percent travel of an accelerator pedal 124 for controlling the torque/power output of the electric motors 104, 108, hence the speed of the electric vehicle 100. The accelerator pedal 124 may be that of a traditional floor mounted foot pedal 124, a steering wheel mounted hand pedal 124 located adjacent the steering wheel, or a counsel mounted lever 124.

The controller 122 may include one or more processors 124, memory 126 and other components typically present in computing devices. The memory 126 is a non-transitory computer readable media that stores information accessible by the one or more processors 124, including instructions and data that may be executed or otherwise used by the processors 124 to implement a method 500, which is disclosed in detail below. The memory 126 may be of any type capable of storing information accessible by the processors 124, including a computing device-readable medium, or other medium that stores data that may be read with the aid of an electronic device, such as a hard-drive, memory card, ROM, RAM, DVD or other optical disks, as well as other write-capable and read-only memories.

While only one controller 122 is shown, the electric vehicle 100 may have multiple controllers 122. The respective controllers 122 may exchange various signals by a telematics server or Controller Area Network (CAN) communication 123. Each of the controllers 122 may contain one or more processors, memory and other components typically present in computing devices. Furthermore, each 122 may control one or more systems, and one system may be control by multiple controllers 122. For the purpose of brevity, the one or more controller 122 will be referred to in the collective as the controller 122.

The clutch-to-clutch shift is also known as a single-transition shift which means only one off-going clutch needs to be released and one on-coming clutch needs to be engaged. Therefore, the two clutches 114, 118 are needed to be controlled during the shift. The controlled synchronization of these two clutches 114, 118 is accomplished by the controller 122. There are four types of clutch-to-clutch shifts, that is, power-on upshift, power-on downshift, power-off upshift, and power-off downshift. When the torque/power is transferred from the first electric motor 104 during the clutch-to-clutch shift, this type of shift is called a power-on shift. The power-on upshift go through a torque phase and then an inertia phase. An issue associated with a power-on upshift is motor torque drop at the end of the torque phase, the motor torque increases near the end of the inertia phase causing the output axle torque to oscillation after the end of the inertia phase after the on-coming clutch is fully engaged. This sequence of events causes an abrupt fluctuation in the torque output of the driven axle, thereby resulting in vehicle acceleration oscillation of the electric vehicle 100. The abrupt fluctuation in torque output from the output axle and resulting vehicle acceleration oscillation during the power-on upshift result in reduced ride comfort experienced by the passenger of the vehicle 100 and gives the perception of a non-quality transmission shift.

Figure 2A:
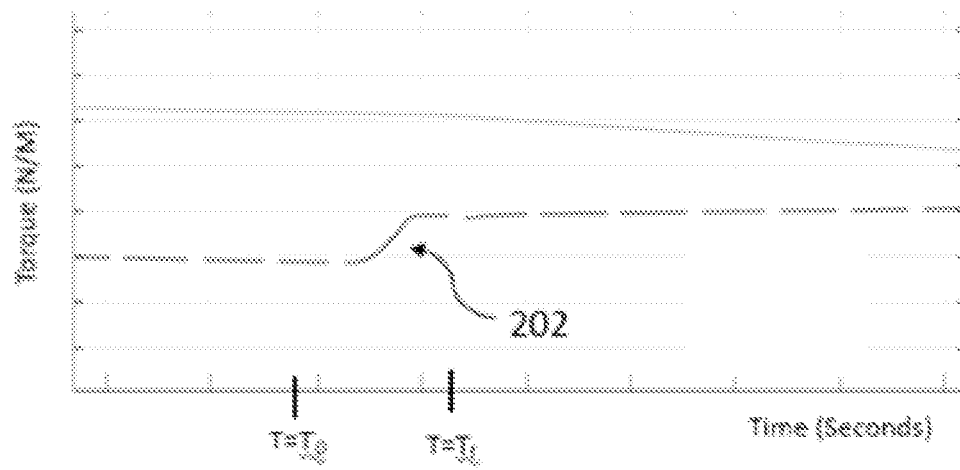
FIG. 2A is a graph showing a first motor torque and a second motor torque during an upshift of the multi-speed gearbox, according to an exemplary embodiment.
Figure 2B:
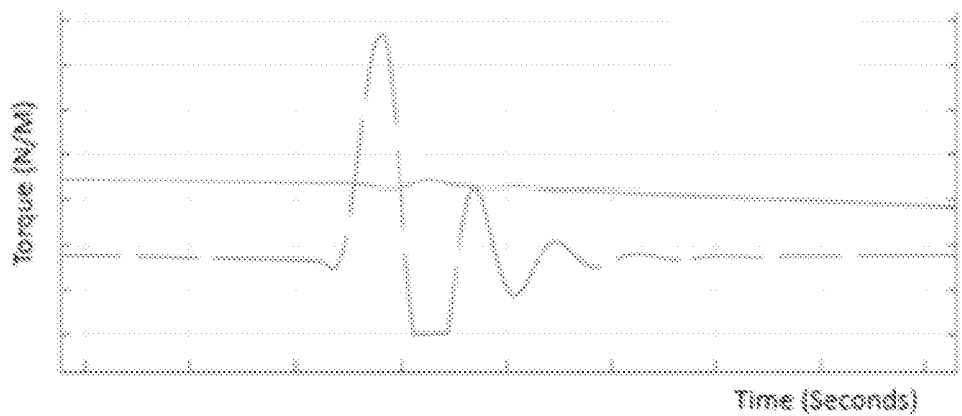
FIG. 2B is a graph showing a first axle torque and a second axle torque during the upshift of the multi-speed gearbox, according to an exemplary embodiment.
Figure 2C:
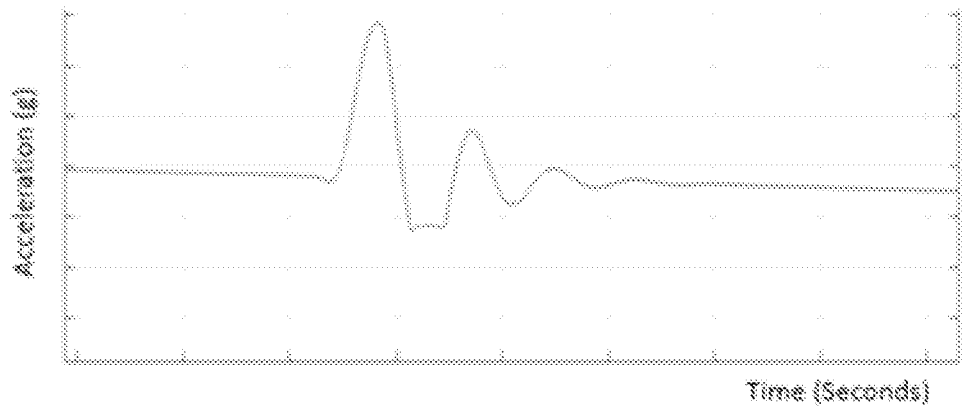
FIG. 2C is a graph showing a vehicle acceleration oscillation of the electric vehicle during the upshift of the multi-speed gearbox, according to an exemplary embodiment.

FIG. 2A, shows the torque output of the first electric motor 104 (dashed line), also referred to as a first motor torque, and the torque output of the second electric motor 108 (solid line), also referred to as a second motor torque, during a power-on upshift event. FIG. 2B shows a first axle torque output (dash-line), also referred to as a first axle torque, and a second torque axle output (solid-line), also referred to as a second axle torque, during the power-on upshift event. FIG. 2C shows the vehicle acceleration oscillation during the power-on upshift event. The units of the horizontal axes for FIGS. 2A-2C are in units of time (seconds), the units of the vertical axis of FIGS. 2A and 2B are in units of torque (Newton-Meter), and the units of the vertical axis of FIG. 2C is in acceleration (g) expressed as a ratio to earth's gravity.

Referring to FIG. 2A, the solid line represents the front motor torque and the dashed line represents the rear motor torque during a power-on upshift at 50% accelerator pedal travel. Accelerator pedal travel is defined as the percentage of displacement from 0 percent, when the accelerator pedal 124 is in a non-actuated state, to 100 percent when the accelerator pedal 124 is a fully-actuated state. For example, the percentage of a foot accelerator pedal travel is at 0 percent when the foot accelerator pedal 124 is at the top most position and 100 percent when the foot actuated accelerator pedal 124 is at the bottom most position. The clutch-to-clutch shift event begins at $T=T_0$ and completes at T=$T_F$. During the clutch-to-clutch shift, the rear motor torque increases 202 before leveling off due to the rear speed ratio change of the gearbox 112, while the front motor torque remains relatively steady.

Referring to FIG. 2B, the solid line represents the front axle torque and the dashed line represents the rear axle torque, during the power-upshift at 50% accelerator pedal travel. During the clutch-to-clutch shift, the rear axle torque (dash-line) exhibits an abrupt fluctuation, while the front axle torque (solid-line) remains relatively flat. The abrupt amplitude and frequency fluctuation of the rear axle torque causes an abrupt oscillation in the acceleration of the electric vehicle 100 as shown in FIG. 2C. The abrupt oscillation in the acceleration of the electric is perceived as a poor quality gearbox shift.

Figure 3A:
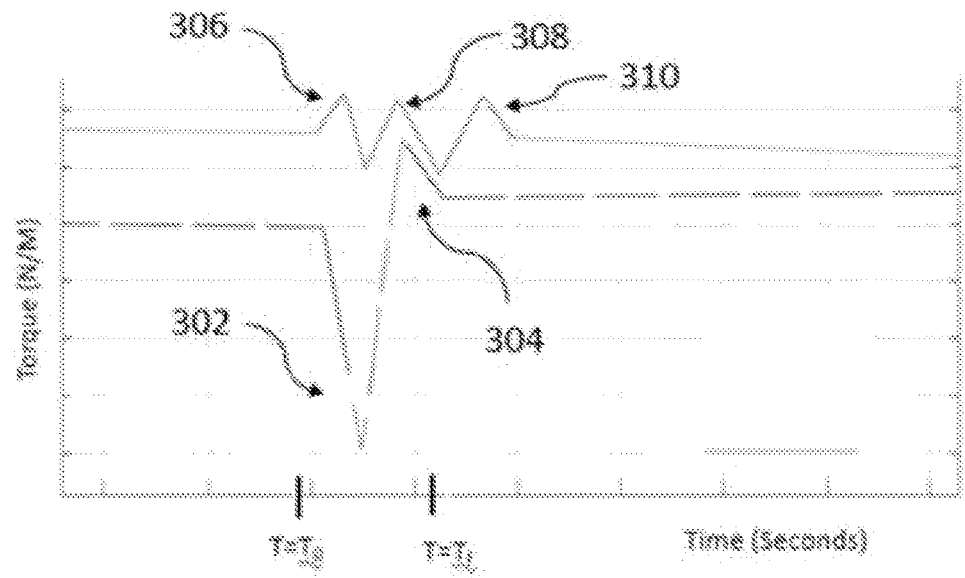
FIG. 3A is a graph showing a controlled modulation of the first motor torque and a controlled modulation of the second motor torque during a upshift of the multi-speed gearbox, according to an exemplary embodiment.
Figure 3B:
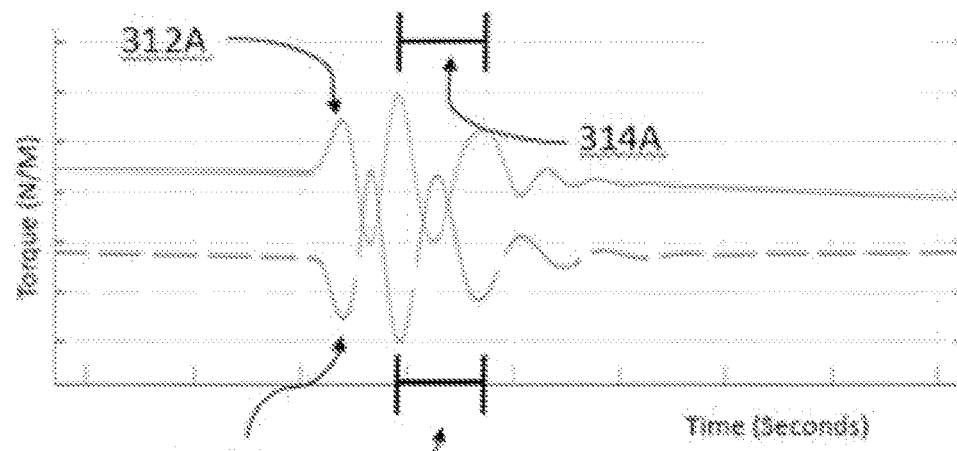
FIG. 3B is a graph showing a first axle torque oscillation and a second axle torque oscillation generated by the controlled modulation of the first and second motor torque, respectively, according to an exemplary embodiment.
Figure 3C:
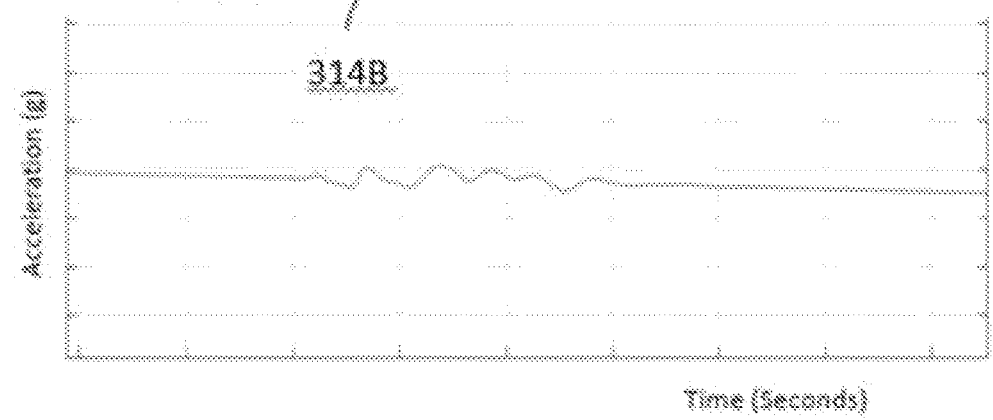
FIG. 3C is a graph showing a dampened vehicle acceleration oscillation of the electric vehicle resulting from the second axle torque oscillation compensating the first axle torque oscillation, according to an exemplary embodiment.

FIG. 3A, shows the first motor and second motor torques during a controlled power-on upshift, FIG. 3B shows the first axle and second axle torques during the controlled power-on upshift, and FIG. 3C shows the vehicle acceleration oscillation during the controlled power-on upshift. The power-on upshift is controlled to minimize the vehicle acceleration oscillation at 50% accelerator pedal travel.

Referring to FIG. 3A, the rear electric motor is modulated during the controlled power-on upshift to minimize the abrupt amplitude fluctuation of the rear axle torque caused by the clutch-to-clutch shift is shown in FIG. 3B. The first electric motor modulation includes first decreasing the first motor torque at reference 302 in the torque phase follow by increasing a first motor torque at reference 304 in the inertial phase.

Still referring to FIG. 3A, contemporaneously, the front electric motor 108 is modulated by temporarily increasing the front electric motor torque during the torque phase at reference 306 and again at references 308, 310 during and after the inertial phase to produce a front axle torque oscillation that compensates for the rear axle oscillation by at least offsetting the rear axle oscillation. The front axle torque oscillation is sufficiently out-of-phase with the rear axle torque oscillation to effectively dampen the vehicle acceleration oscillation. Preferably front axle torque oscillation is out-of-phase with the rear axle torque oscillation, both in amplitude 312A, 312B and frequency 314A, 314B as shown in FIG. 3B, where the two waves' phasors are complete opposite and having the same amplitude, therefore cancelling each other out to achieve a smoother vehicle acceleration as perceived by the occupants of the electric vehicle.

The modulation of the front electric motor produces a front axle torque oscillation capable of offsetting the rear axle torque oscillation to smooth out the vehicle acceleration oscillation during the power-on upshift, resulting in a smoother and therefore, higher quality shift experience for the occupants, as shown in FIG. 3C.

The calibration of the rear motor modulation, also referred to as the rear motor calibration, sufficient to minimize the abrupt amplitude vibration fluctuation of the rear axle torque caused by the clutch-to-clutch shift can be done experimentally beforehand and stored in a lookup table accessible to the controller 122 to retrieve and execute, when the controller 122 detects a command for a power-on upshift. Similarly, the calibration of the front motor modulation, also referred to as the front motor calibration, sufficient to produce a front axle torque oscillation capable of compensating the rear axle torque oscillation to smooth out the vehicle acceleration oscillation can be done experimentally beforehand and stored in the lookup table. The calibration of the actuation pressures and timing of the clutches to effectuate a clutch-to-clutch shift, also referred to as a clutch actuation calibration, can be done experimentally beforehand and stored in the lookup table. The rear motor calibration, the front motor calibration, and the clutch actuation calibration can be done for predetermined increments of accelerator pedal travel, preferably at least every 10%, from 0% to 100% travel.

Figure 4:
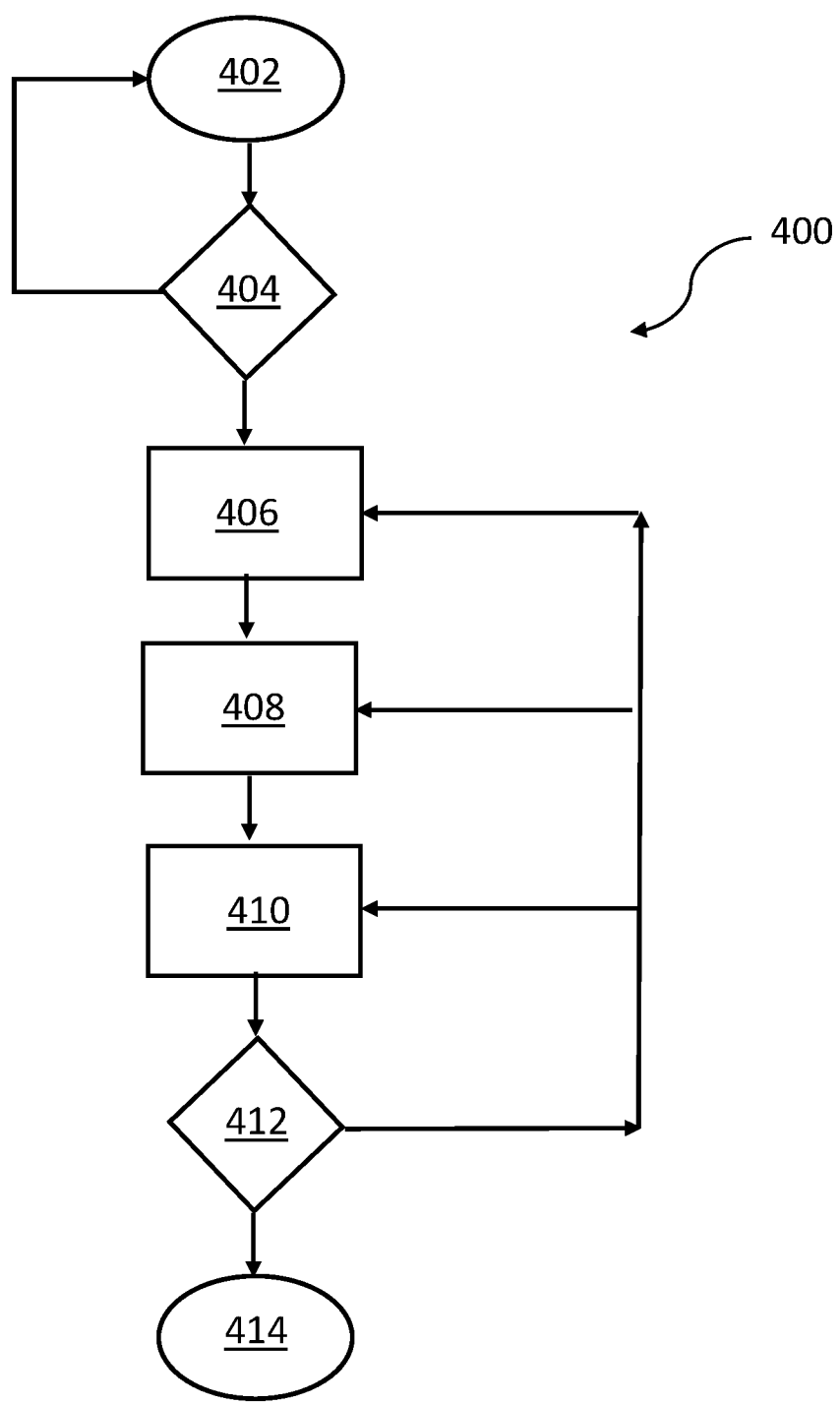
FIG. 4 is a block flowchart showing a method of generating a look-up-table correlating a percentage of accelerator pedal travel with a clutch-to-clutch calibration, a primary electric motor calibration, and an assisting motor calibration for controlling the power-on upshift.

FIG. 4 is a block flowchart of a method 400 for generating a look-up table for use in the method 500 for an electric vehicle power-on upshift control to ensure a quality shift feel. The method presented is directed to a two-speed gearbox 112 mated to the rear electric motor 104. It should be appreciated that methods 400 and 500 are also applicable to a two-speed gearbox 112 mated to the front electric motor 108 as opposed to the rear electric motor 104.

The method 400 starts in block 402 by operating the electric vehicle 100 in rear drive mode, in which little to no electrical power is supplied to the front electric motor 108, or in AWD/4WD drive mode where electrical power is supplied to both the rear and front electric motors 104, 108. Moving to block 404, the controller 122 monitors the gearbox 112 for a power-on upshift event such as a request for gear ratio change, a predicted need for a gear ratio change, or an event triggering a need for a gear ratio change, as examples. If no power-on upshift event is detected, the method 400 returns to block 402.

Referring back to block 404, when a power-on upshift event is detected, the method moves to block 406 where the percentage of accelerator pedal travel is recorded, and the clutch actuation pressures and timing are calibrated to minimize the abruptness of the disengagement of the off-going clutch and the engagement of the on-coming clutch to effectuate a change in gear ratio. The clutch actuation calibration is recorded with respected to the percentage of accelerator pedal travel.

Moving to block 408, during the transition of the off-going and on-coming clutches, the rear electric motor modulation is calibrated to reduce the inertial phase of the rear axle torque rise resulting in a rear axle torque having smaller amplitude and frequency oscillations. Moving to block 410, the front electric motor is calibrated to compensate for the rear axle torque oscillation by generating a front axle torque oscillation that is sufficient to compensate the rear axle torque oscillation to reduce the overall vehicle acceleration oscillation and achieve high drive shift quality.

Moving to block 412, the resulting vehicle acceleration oscillation generated from the rear motor calibration, the front motor calibration, and the clutch actuation calibration is evaluated to determine if it satisfies a predetermined shift quality. If not, the method 400 may return to blocks 406, 408, and 410. If the quality is satisfactory, then the method moves to block 414 and ends. This method 400 is repeated for a predetermined increment of percentage of accelerator pedal travel. For example, this method 400 may be repeated for every 10% of accelerator pedal travel from 0% to 100% to provide a look-up table referencing a percentage of accelerator pedal travel with a rear motor calibration, a front motor calibration, and a clutch actuation calibration.

Figure 5:
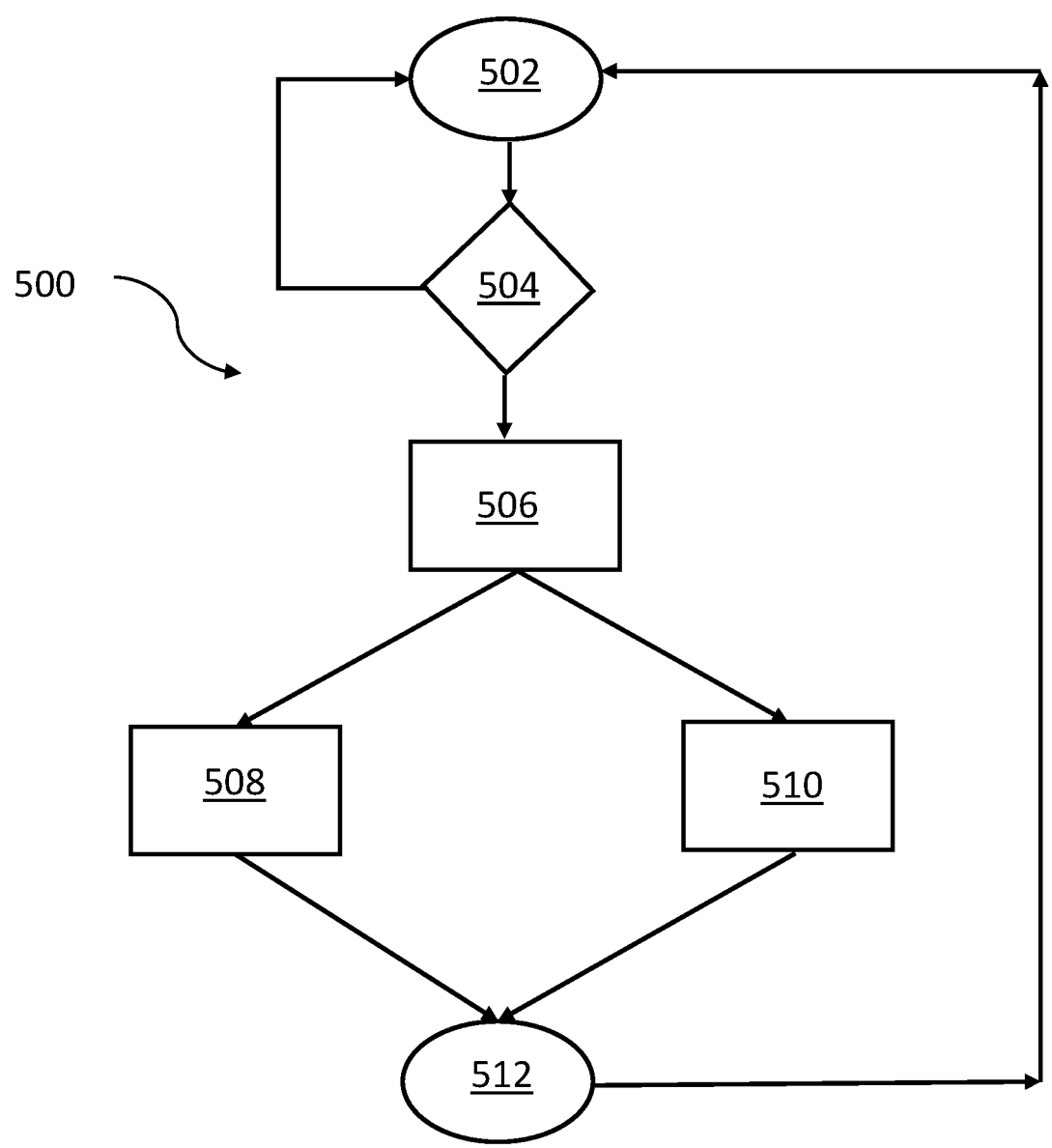
FIG. 5 is a block flowchart showing a method of multi-speed electric vehicle power-on upshift control.

FIG. 5 presents a block flowchart of a method 500 for an AWD/4WD electric vehicle power-on upshift control to ensure a quality shift feel, by reducing the vehicle acceleration oscillation during the power-on upshift.

Referring to both the electric vehicle 100 of FIG. 1 and the method 500 of FIG. 5. The method 500 starts in block 502 when an electric vehicle 100 is in drive mode being propelled by at least one of a first electric motor 104 and a second electric motor 108. Moving to block 504, the controller 122 monitors the multi-speed gearbox 112 for a power-on upshift event. If no power-on upshift event is detected by the controller 122, the method returns to block 502.

Referring back to block 504, when a power-on upshift event is detected by the controller 122, the method moves to block 506 where the controller 122 determines the percentage of accelerator pedal travel is being applied. Using the calibration look-up table generated from the method 400 disclosed above and shown in FIG. 4, the controller 122 retrieves a rear motor calibration, a front motor calibration, and a clutch actuation calibration corresponding to the determined percentage of accelerator pedal travel.

Moving to block 508, the controller 122 applies the clutch actuation calibration to the off-going and on-going clutches to effectuate the speed ratio change. Contemporaneously in block 510, the controller 122 simultaneously applies the rear electric motor calibration to modulate the rear electric motor while applying the front electric motor calibration to modulate the front electric motor. The modulation of the front motor generates a front axle torque oscillation sufficient to compensate the rear axle torque oscillation, which is caused by the combination of the clutch actuation and modulation of the rear electric motor so that the vehicle acceleration oscillation is reduced. Referring back to FIG. 3B, the modulation of the front electric motor generates a sinusoidal front axle torque oscillation that is out-of-phase with the sinusoidal rear axle torque oscillation, thereby dampening the vehicle acceleration oscillation during the power-on upshift event.

Moving to block 512, the power-on upshift event is completed and the vehicle 100 continues in drive mode. The method returns to block 502 and repeats the method 500.

The present disclosure may more effectively reduce acceleration oscillations during a power-on upshift in an electric vehicle 100 propelled by a first electric motor 104 mated to a multi-speed gear box and a second electric motor 108. The reduction in acceleration oscillation during a power-on upshift gives the perception of a smoother and higher quality shift feel to the occupants of the electric vehicle 100 without any additional structural cost to the vehicle 100. The above teachings of the concept of using the front motor to control the front axle torque oscillation to compensate the rear axle torque oscillation during power-on upshifts can be similarly applied to other types of shift events including power-on downshifts, power-off upshifts and power-off downshifts.

The description of the present disclosure is merely exemplary in nature and variations that do not depart from the general sense of the present disclosure are intended to be within the scope of the present disclosure. Such variations are not to be regarded as a departure from the spirit and scope of the present disclosure.

What is claimed is:

1. A method of shift control for an electric vehicle comprising:
    detecting a shift event for a multi-speed gearbox having at least one actuatable clutch for selectively effectuating a gear ratio change, wherein the multi-speed gearbox is adapted to receive a first motor torque from a first electric motor and output a first axle torque to a first axle;
    actuating the at least one actuatable clutch to effectuate the gear ratio change, thereby generating a first axle torque oscillation in the first axle; and
    modulating a second electric motor to generate a second axle torque oscillation in a second axle sufficient to offset the first axle torque oscillation in the first axle to reduce a vehicle acceleration oscillation of the electric vehicle.

2. The method of claim 1, further comprising:
    determining a percent of travel of an accelerator pedal when the shift event is detected;
    retrieving a second electric motor calibration correlating to the determined percent of travel of the acceleration pedal; and
    applying the second electric motor calibration in modulating the second electric motor to generate the second axle torque oscillation in the second axle.

3. The method of claim 2, further comprising:
    retrieving a clutch actuation calibration correlating to the determined percent of travel of the acceleration pedal; and
    applying the clutch actuation calibration in actuating the at least one clutch to effectuate the gear ratio change.

4. The method of claim 3, further comprising:
    retrieving a first electric motor calibration correlating to the determined percent of travel of the acceleration pedal; and
    applying the first electric motor calibration in modulating the first electric motor and the actuating the at least one clutch to generate the first torque oscillation in the first axle.

5. The method of claim 4, wherein the second axle torque oscillation is out-of-phase with the first torque oscillation.

6. The method of claim 4, wherein the shift event includes a power-on upshift.

7. The method of claim 4, further comprising a power-on upshift, wherein actuating the at least one clutch includes a clutch-to-clutch shift defining a torque phase followed by an inertial phase.

8. The method of claim 7, wherein the first electric motor calibration includes decreasing the first motor torque during the inertial phase, and wherein the second electric motor calibration includes increasing a second motor torque during the torque phase.

9. The method of claim 8, wherein the second electric motor calibration includes modulating the second motor during the inertial phase.

10. The method of claim 9, the second electric motor calibration further includes modulating the second motor after the inertial phase.

11. A method for multi-speed electric vehicle power-on shift control, comprising:
    displacing an accelerator pedal;
    detecting a shift event for a multi-speed gearbox adapted to receives a first motor torque from a first electric motor and outputs a first axle torque to a first axle, wherein the multi-speed gearbox includes a plurality of actuatable clutches for effectuating a gear ratio change;
    determining a percentage of accelerator pedal travel when the shift event is detected;
    retrieving a clutch calibration, a first electric motor calibration, and a second electric motor calibration correlating with the determined percentage of accelerator pedal travel;
    applying the clutch calibration in actuating the plurality of actuable clutches to effectuate the gear change ratio and applying the first electric motor calibration in modulating the first electric motor, wherein the actuating of the plurality of actuable clutches and the modulating the first electric motor generates a first axle torque oscillation in the first axle; and applying the second electric motor calibration in modulating the second electric motor to generate a second axle torque oscillation effective to compensate for the first axle torque oscillation in the first axle to reduce a vehicle acceleration oscillation of the electric vehicle.

12. The method of claim 11, wherein the shift event includes a power-on upshift.

13. The method of claim 11, wherein the second axle torque oscillation is out-of-phase with the first axle torque oscillation wave.

14. The method of claim 11, wherein:
actuating the plurality of actuatable clutches includes a clutch-to-clutch upshift defining a torque phase and an inertial phase,
modulating the first electric motor includes decreasing a first motor torque during the inertial phase, and
modulating the second electric motor includes increasing a second motor torque during the torque phase.

15. The method of claim 14, wherein the second electric motor calibration includes modulating the second motor torque during the inertial phase and after the inertial phase to generate a second axle torque oscillation sufficiently out-of-phase with the first axle torque oscillation to dampen the acceleration oscillation of the electric vehicle.

16. The method of claim 15, wherein the first electric motor and the first axle is a rear electric motor and a rear axle, respectively, and the second electric motor and the second axle is a front electric motor and a front axle, respectively.

17. A method for multi-speed electric vehicle shift control for damping an acceleration oscillation of the electric vehicle, comprising:
determining a percentage of accelerator pedal travel;
retrieving a clutch calibration, a first electric motor calibration, and a second electric motor calibration correlating with the determined percentage of accelerator pedal travel;
applying the clutch calibration in actuating a clutch-to-clutch gear ratio change, thereby generating a vibration fluctuation in a first axle;
applying the first electric motor calibration in modulating a first electric motor to dampen the vibration fluctuation, thereby generating a first axle torque oscillation;
the second electric motor calibration in modulating the second electric motor in generating a second axle torque oscillation sufficiently out-of-phase with the first axle torque oscillation to dampen the acceleration oscillation of the electric vehicle.

18. The method of claim 17, wherein the clutch-to-clutch gear ratio change includes a power-on upshift.

19. The method of claim 18, wherein second axle torque oscillation is out-of-phase with the first axle torque oscillation.

20. The method of claim 19, wherein the first axle is one of a front axle and a rear axle of the electric vehicle.

* * * * *